United States Patent
Nguyen et al.

(10) Patent No.: US 11,380,356 B2
(45) Date of Patent: *Jul. 5, 2022

(54) FLEXIBLE ON-CYLINDER LIMIT FOR DRIVE PERFORMANCE MANAGEMENT

(71) Applicant: Seagate Technology LLC, Fremont, CA (US)

(72) Inventors: Phan Linh Nguyen, Shugart (SG); Chi Sern Georgie Tan, Shugart (SG); Qiang Bi, Shugart (SG); Joshua W. Christensen, Savage, MN (US); Song Wee Teo, Shugart (SG); Wei Chen Lau, Shugart (SG); Heather Lee Mallett, Longmont, CO (US); Renee Depew, Niwot, CO (US); David Allan Thorsvik, Longmont, CO (US); Tze Pin Chin, Shugart (SG); Jose Mari Toribio, Shugart (SG)

(73) Assignee: SEAGATE TECHNOLOGY LLC, Fremont, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/218,810

(22) Filed: Mar. 31, 2021

(65) Prior Publication Data

US 2021/0407539 A1    Dec. 30, 2021

Related U.S. Application Data

(63) Continuation of application No. 16/916,786, filed on Jun. 30, 2020, now Pat. No. 10,997,996.

(51) Int. Cl.
| | | |
|---|---|---|
| *G11B 5/09* | (2006.01) | |
| *G11B 5/596* | (2006.01) | |
| *G11B 20/12* | (2006.01) | |
| *G11B 20/10* | (2006.01) | |
| *G11B 33/12* | (2006.01) | |

(52) U.S. Cl.
CPC .... *G11B 5/59627* (2013.01); *G11B 20/10388* (2013.01); *G11B 20/1217* (2013.01); *G11B 33/125* (2013.01); *G11B 2020/1275* (2013.01); *G11B 2020/1281* (2013.01)

(58) Field of Classification Search
None
See application file for complete search history.

(56) References Cited

U.S. PATENT DOCUMENTS

| | | | |
|---|---|---|---|
| 6,583,965 B1 * | 6/2003 | Forbord | G11B 33/121 |
| | | | 360/294.4 |
| 9,070,411 B1 * | 6/2015 | Ellis | G11B 5/59661 |
| 9,607,633 B1 * | 3/2017 | Toribio | G11B 20/1217 |
| 10,997,996 B1 * | 5/2021 | Nguyen | G11B 5/59627 |
| 2005/0254359 A1 * | 11/2005 | Yak | G11B 7/0945 |
| | | | 369/44.23 |

(Continued)

*Primary Examiner* — Peter Vincent Agustin
(74) *Attorney, Agent, or Firm* — Holzer Patel Drennan

(57) ABSTRACT

The technology disclosed herein provides a method for generating an on-cylinder limit (OCLIM), the method including performing servo certification of a plurality of drives in a storage device to generate servo adaptive parameters (SAPs) by heads, generating a plurality of read adjust parameters (RAPs) by heads for the plurality of drives, generating an interim OCLIM value based on the SAPs by heads and RAPs by zones, and operating a disc drive write element using the interim OCLIM value.

20 Claims, 6 Drawing Sheets

(56) References Cited

U.S. PATENT DOCUMENTS

| | | | |
|---|---|---|---|
| 2006/0146433 A1* | 7/2006 | Chan | G11B 5/012 360/31 |
| 2012/0044593 A1* | 2/2012 | Xiao | G11B 19/046 360/31 |
| 2012/0176698 A1* | 7/2012 | Rub | G11B 5/012 360/31 |
| 2016/0034342 A1 | 2/2016 | Toh et al. | |
| 2018/0322902 A1 | 11/2018 | Qiang et al. | |

* cited by examiner

FLEXIBLE ON-CYLINDER LIMIT FOR DRIVE PERFORMANCE MANAGEMENT

CROSS-REFERENCE TO RELATED APPLICATIONS

The present application is a continuation application of and claims priority of U.S. patent application Ser. No. 16/916,786 filed on Jun. 30, 2020 and entitled "FLEXIBLE ON-CYLINDER LIMIT FOR DRIVE PERFORMANCE MANAGEMENT," which is incorporated herein by reference in its entirety.

BACKGROUND

Write fault thresholds, also referred to as on-cylinder limits (OCLIMs), may be established on opposing sides of a track's centerline. During a write operation to a track of a storage drive's disk, the head's write element may be positioned so as to be nominally centered over the track's centerline as the disk platter rotates adjacent the head. Likewise, during a read operation, the head's read element may generally be positioned to follow the track's centerline as well. Should the write element exceed a specified write fault threshold, a write fault interrupt may be declared, and further writing may be temporarily suspended until the position error of the head is determined to be smaller than the write fault threshold. Example write fault thresholds may be on the order of anywhere between 10% to 20% of a track's total width, although other values greater or less than these may be used.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following, more particular written Detailed Description of various implementations as further illustrated in the accompanying drawings and defined in the appended claims.

In at least one implementation, the technology disclosed herein provides a method for generating an on-cylinder limit (OCLIM), the method including performing servo certification of a plurality of drives in a storage device to generate servo adaptive parameters (SAPs) by heads, generating a plurality of read/write adaptive parameters (RAPs) by heads for the plurality of drives, generating an interim OCLIM value based on the SAPs by heads and RAPs by zones, and operating a disc drive write element using the interim OCLIM value.

These and various other features and advantages will be apparent from a reading of the following Detailed Description.

BRIEF DESCRIPTIONS OF THE DRAWINGS

A further understanding of the nature and advantages of the present technology may be realized by reference to the figures, which are described in the remaining portion of the specification. In the figures, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

DETAILED DESCRIPTION

Implementations described herein pertains to varying the on-cylinder limit (OCLIM) for various heads and zones of a storage device during a certification process. Specifically, the technology provides a servo adaptive parameters (SAP) structure to store the OCLIM by heads and zones that allows for vibration performance management for a storage device cabinet. Example implementations of the technology allows for a certification process to be implemented in phases, including a first servo phase where servo tests are used to adjust OCLIM in the SAP table and a second test phase where the OCLIM from the SAP table is adjusted with read adaptive parameters (RAP) and global OCLIM adjust limit (GOAL) parameter.

Figure 1:
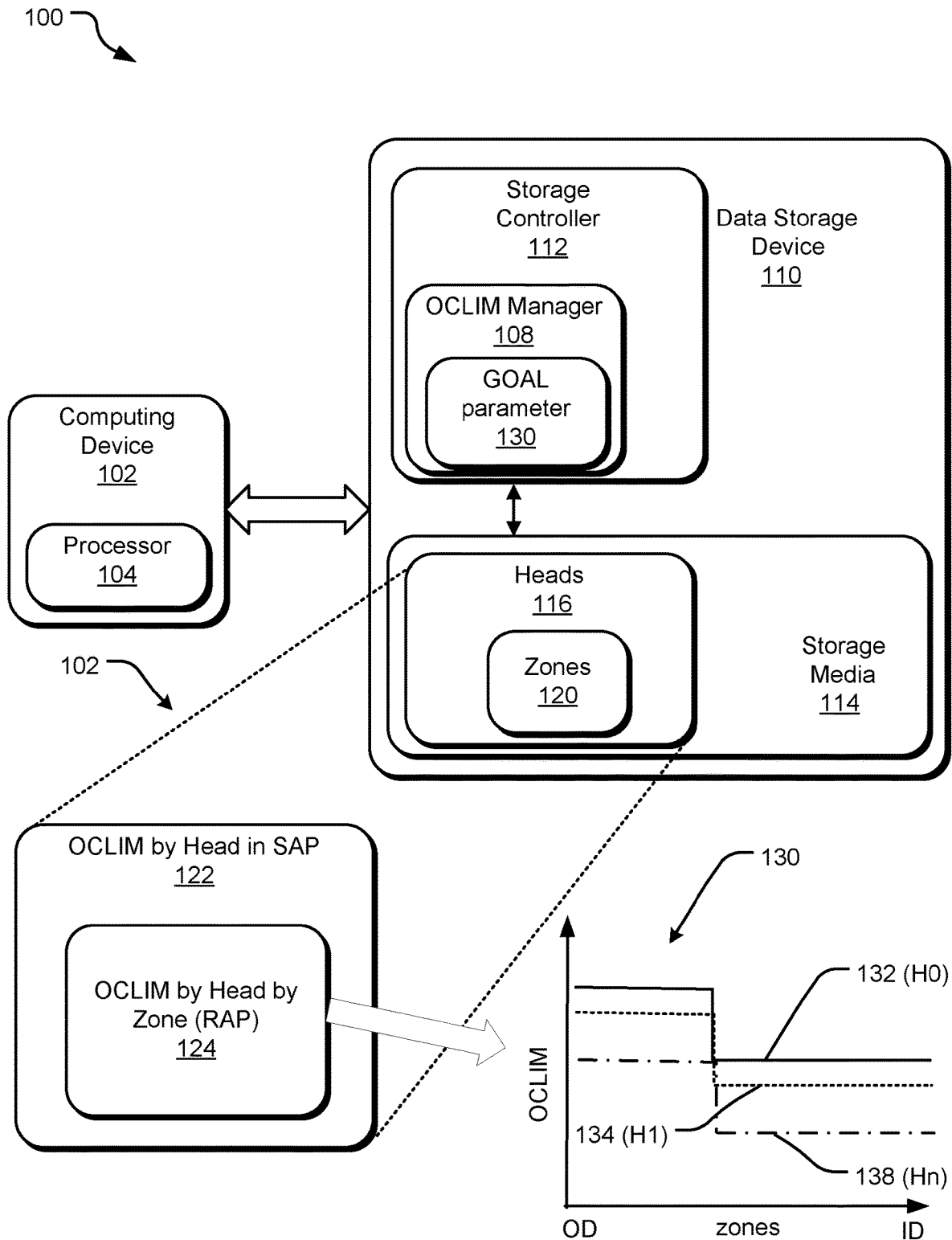
FIG. 1 is a block diagram of an example data storage system providing flexible on-cylinder limit.

FIG. 1 is a block diagram of a data storage system 100 providing flexible on-cylinder limit. The data storage system 100 may include a data storage device 110 that is communicatively connected to a computing device 102 having a processor 104. For example, the data storage device 110 may be a magnetic disc drive, an optical disc drive, etc. Alternatively, the storage device 110 may include hard disc drives and solid state hybrid drives, store data on magnetic media, as well as optical media, solid state media such as NAND, NVRAM, Resistive RAM (ReRAM), Magnetic RAM (MRAM), Phase Change Memory (PCM), and other advanced and staid memory technologies.

The illustrated implementation of the data storage device 110 includes a storage controller 112 that manages storage media 114. The storage media 114 may be magnetic storage media that can be written to and read from using reader heads 116. Furthermore, each of the various reader heads 116 may read data from various zoned 120 of the storage media 114. The storage controller 112 may control heads 116 using one or more servo mechanisms (not disclosed).

In one implementation, each of the various heads 116 may be associated with write fault thresholds, also referred to as on-cylinder limits (OCLIMs) 122 for the storage data tracks associated with the various heads 116. The OCLIM 122 for the heads 116 may be stored in servo adaptive parameter (SAP) tables for each head. Furthermore, the OCLIMs 122 may be determined during a certification process such that it is flexible OCLIM 124 by head by zone such that it varies from an outer diameter (OD) to an inner diameter (ID). For example, such flexible OCLIMs 124 by zone, varying from outer diameter (OD) to an inner diameter (ID) of the storage media per head is disclosed by a graph 130. The flexible OCLIMs 124 maybe stored Specifically, the graph 130 illustrates a flexible OCLIM 132 for head 0 (H0), a flexible OCLIM 134 for head 1 (H1), flexible OCLIM 138 for head n (Hn), etc. As shown, the OCLIMs 132, 134, . . . 138 are each different from each other and each of them varies by zones from OD to ID. In an implementation disclosed herein, the storage controller 112 stores one or more instructions for an OCLIM manager 108. The OCLIM manager 108 may also store a global OCLIM adjust limit (GOAL) that may be used to determine the flexible OCLIM 124. The OCLIM manager 108 may generate servo adaptive parameters (SAPs) by heads 116, read/write adaptive parameters (RAPs) by zones 120, and generate an interim OCLIM value based on the SAPs by heads and RAPs by zones. Example SAP and RAP may be as follows:

SAP OCLIM is 0.428 u" on outer heads (0.7) and 0.208 u" on inner heads (1,2,3,4,5,6).

RAP OCLIM is 0.33 u" at first 40 zones and 0.24 u" at the last 320 zones.

The interim OCLIM value may be adjusted by the GOAL parameter to generate a final OCLIM value that is used by the data storage device in field. In an alternative implementation, the storage controller 112 may determine the GOAL parameter based on observed track mis-registration (TMR) during the certification process. Furthermore, the GOAL parameter may be set to zero at end of the certification process.

Figure 2:
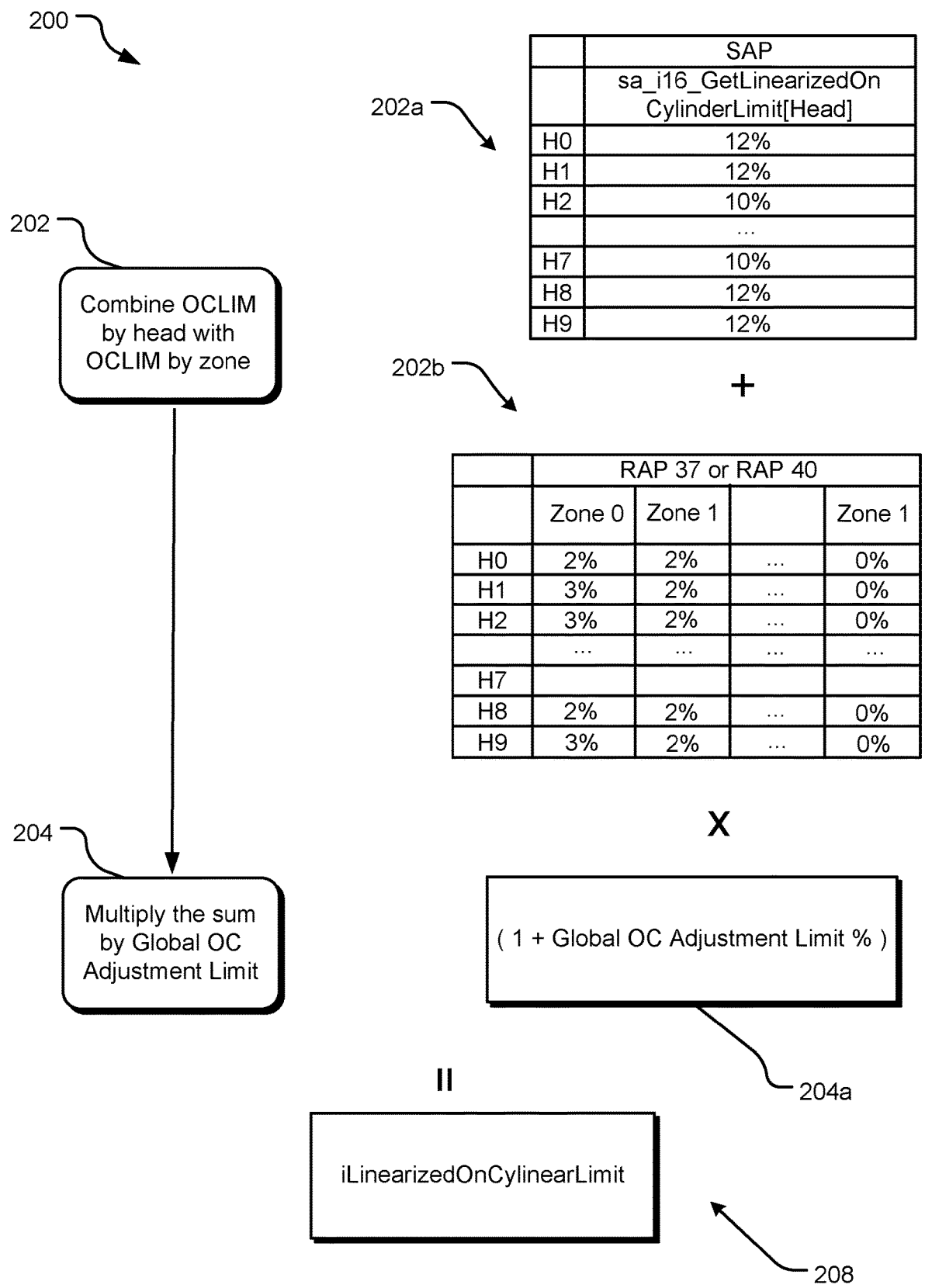
FIG. 2 illustrates an example data structure for used by the system disclosed herein for determining flexible on-cylinder limit.

FIG. 2 illustrates a data structure 200 for used by the system disclosed herein for determining flexible on-cylinder limit. Specifically, the data structure 200 includes an SAP table 202a that stores OCLIM values by heads H0, H1, . . . . H9. A RAP table 202b stores the OCLIM values for various heads by zones. Thus, for each head H0, H1, . . . H9, OCLIM values vary by the zones from OD to ID. An operation 202 combines the OCLIM values from the SAP table 202a to the OCLIM values from the RAP table 202b. An operation 204 multiplies the sum by GOAL parameter 204a value to generate a linearized OCLIM value 208. The linearized OCLIM value 208 may be used by the storage controller during read and write operations of the storage device.

Figure 3:
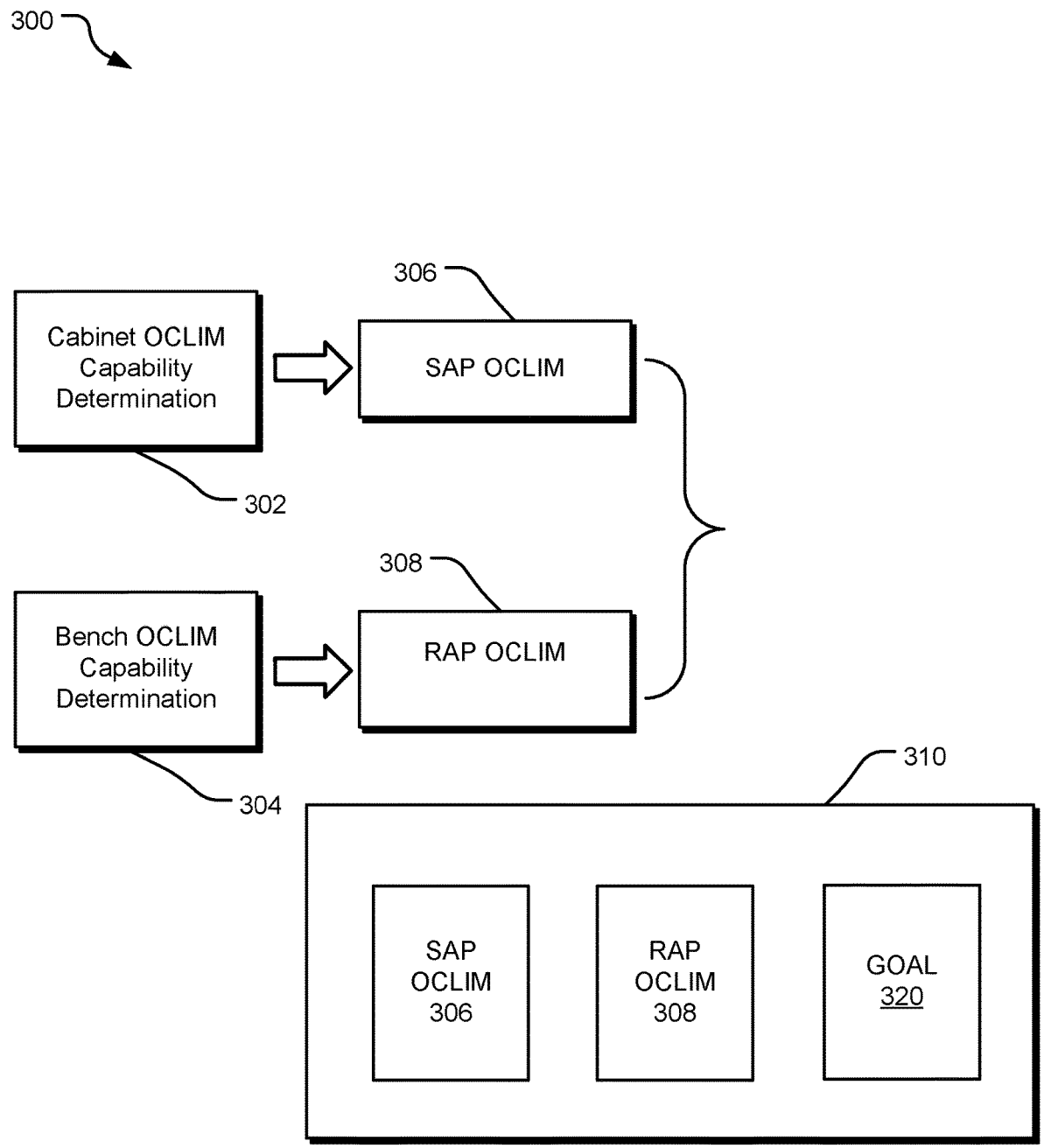
FIG. 3 illustrates an example block diagram of components for determining flexible on-cylinder limit.

FIG. 3 illustrates a block diagram 300 of components for determining flexible on-cylinder limit (OCLIM). A cabinet OCLIM capability determination 302 may be performed during the certification to generate SAP OCLIM 306. The cabinet OCLIM capability determination 302 may involve computing position error signal (PES) by head, determining OCLIM per head, and then determining SAP as count in servo track per inches. The cabinet OCLIM capability determination 302 outputs the SAP OCLIM 306. The bench OCLIM capability determination 304 may involve computing non-repeatable runout (NRRO) and repeatable runout (RRO) by zones, determining OCLIM per zones, and then determining RAP as count in servo track per inches. Using Cabinet TMR for SAP and bench TMR for RAP is one implementation. Alternative implementation may use cabinet TMR for OCLIM SAP and/or OCLIM RAP, bench TMR to determine for OCLIM SAP and/or OCLIM RAP. The batch OCLIM capability determination 304 outputs the RAP OCLIM 308. Both of the SAP OCLIM 306 and the RAP OCLIM 308 and GOAL parameters 320 are used by an OCLIM determination module 310 to generate the final OCLIM that can be used by the disc drive.

Figure 4:
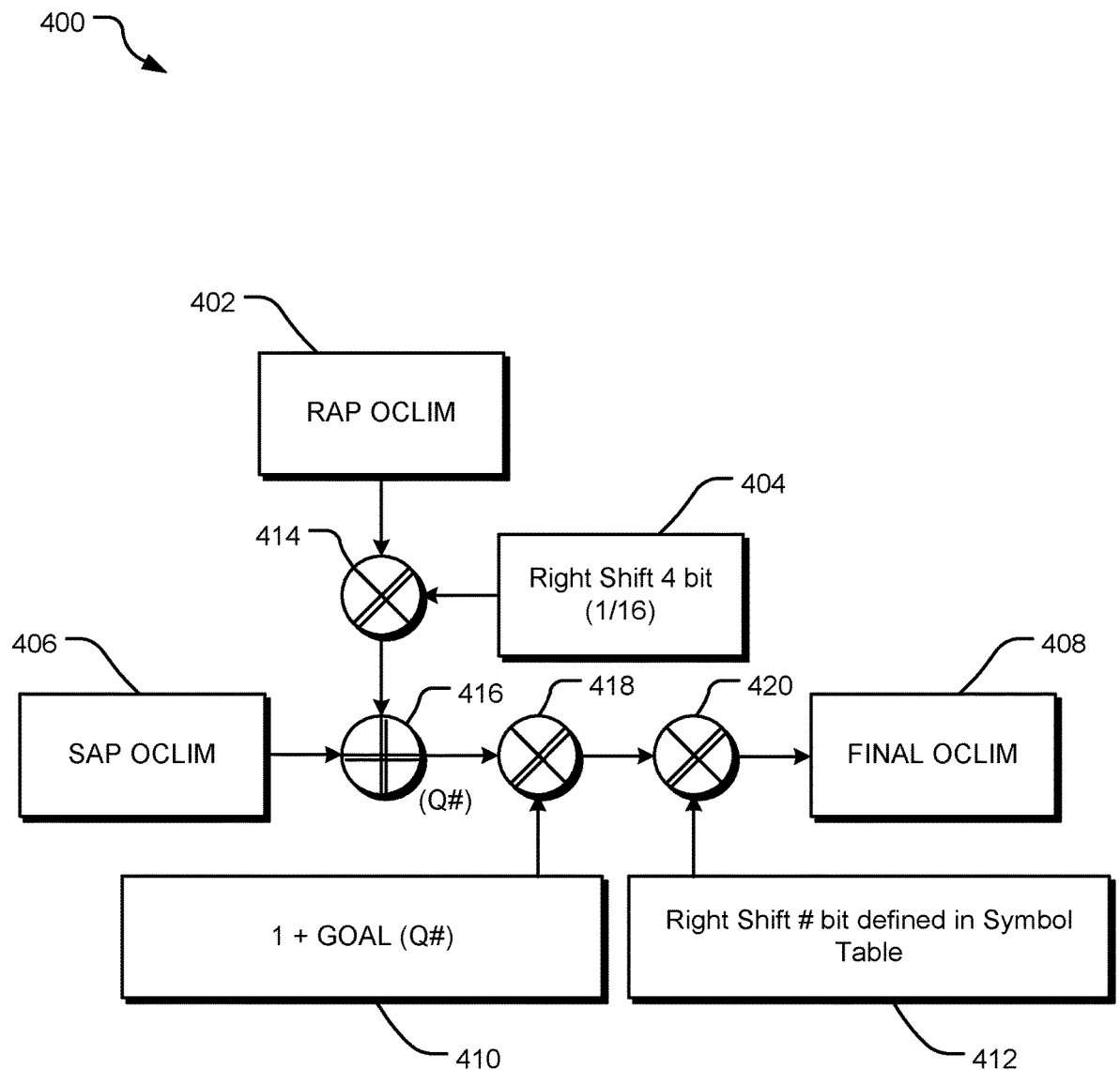
FIG. 4 illustrates an example flow diagram of the servo code for determining flexible on-cylinder limit.

FIG. 4 illustrates a flow diagram 400 of the servo code for determining flexible on-cylinder limit. The values of RAP OCLIM 402 is right shifted at an operation 414 based on the value stored in a register 404. In the illustrated implementation, the register 404 indicates a right shift of four (4) bits. The right shifted RAP OCLIM 402 is added to SAP OCLIM 406 at an operation 416. At operation 418, the output of the addition at operation 416 is adjusted based on a GOAL parameter as provided by 410. In one implementation, the GOAL parameter is determined based on TMR during the certification process.

The GOAL parameter may be used as a single knob during the certification process to adjust the OCLIM. For example, if the GOAL parameter is +20%, OCLIM is increased by 20% across all zoned from OD to ID. On the other hand, if the GOAL parameter is −2%, the OCLIM is decreased by 2% across all zoned from OD to ID. In one implementation the value of the GOAL parameter is set to zero at the end of a certification process. The output of the operation 418 is again right shifted at an operation 420 by a right shift bit defined in a symbol table. For example, the value of this right shift bit may be 10. For example, a +20% GOAL may be represented in a 10-bits integer. The output of the operation 420 is used as the final OCLIM 408 by the disc drive during write and read operations.

Figure 5:
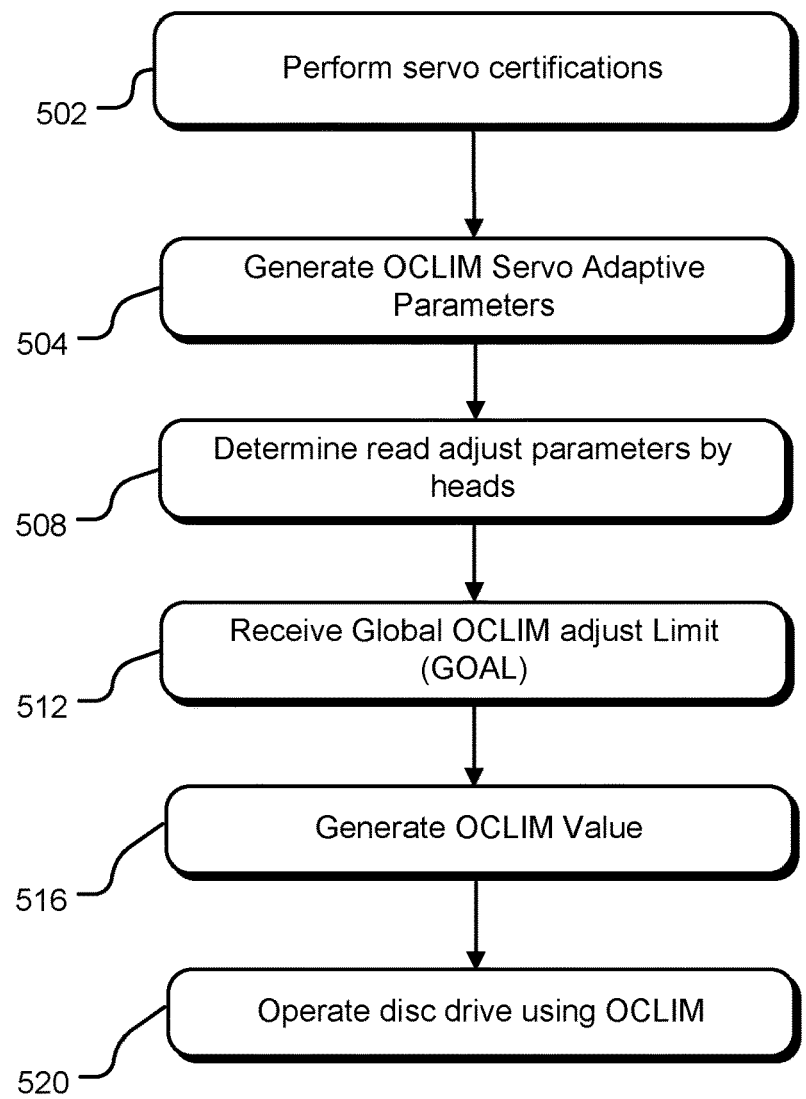
FIG. 5 illustrates alternative example operations for determining flexible on-cylinder limit.

FIG. 5 illustrates alternative operations 500 for determining flexible on-cylinder limit (OCLIM) using the technology disclosed herein. An operation 502 performs servo certification for the disc drive. Such servo certification may involve operating the disc drive a number of times in read and write mode and recording various track parameters. An operation 504 generates OCLIM servo adaptive parameters (SAPs), such OCLIM SAPs may be stored in a SAP table of the storage controller or on the system parameter section of the storage media of the disc drive.

An operation 508 generates various read adjust parameters (RAPs) by heads during the certification process, which may be stored in a RAP table. An operation 512 receives a GOAL parameter, such as a GOAL parameter generated by a storage controller based on track mis-registrations (TMRs). An operation 516 generates an OCLIM value based on the SAP and the RAP as adjusted by the GOAL parameter. Subsequently, an operation 520 operates the disc drive using the OCLIM parameters.

Figure 6:
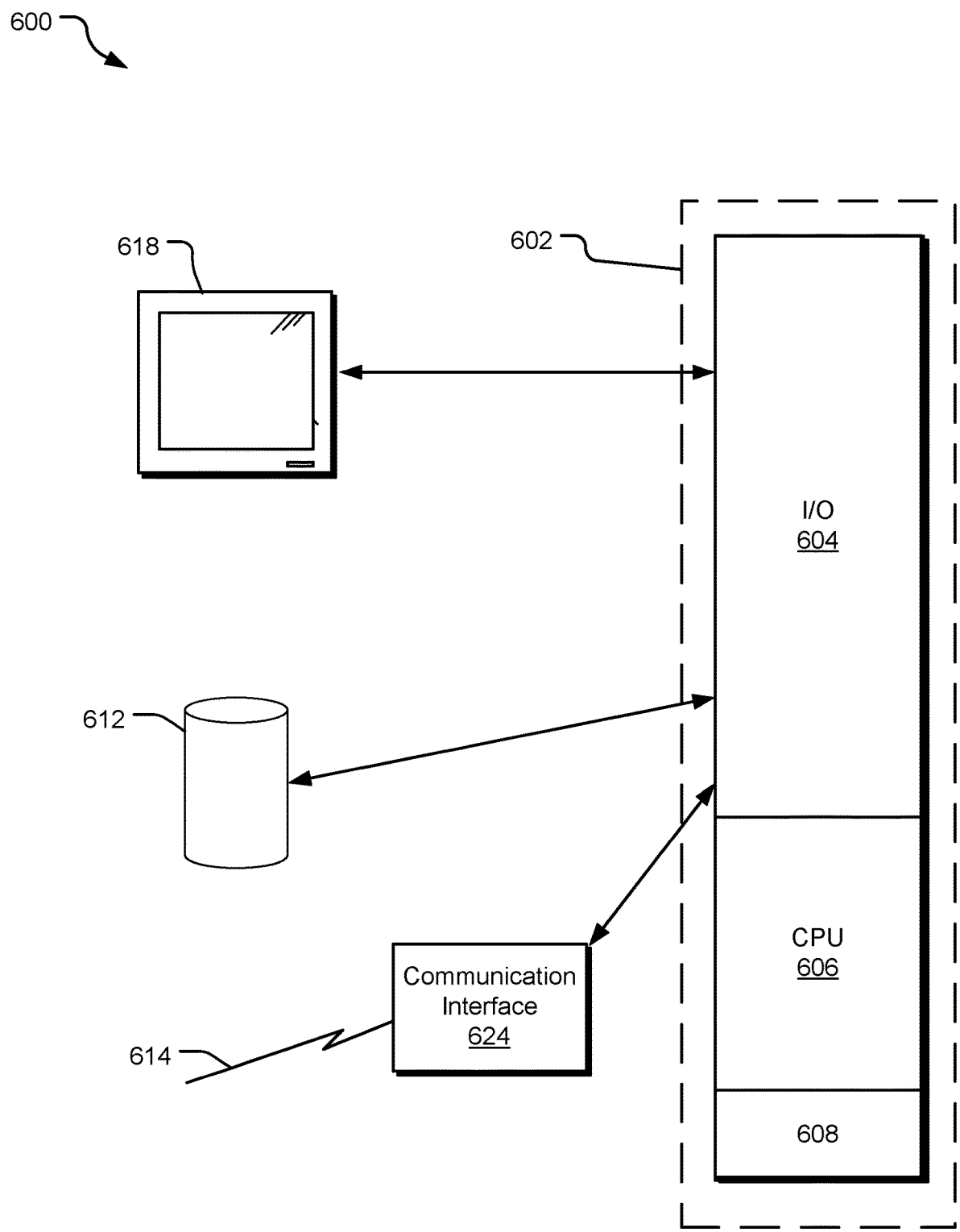
FIG. 6 illustrates an example computing system that may be useful in implementing the described technology.

FIG. 6 illustrates an example processing system 600 that may be useful in implementing the described technology. The processing system 600 is capable of executing a computer program product embodied in a tangible computer-readable storage medium to execute a computer process. Data and program files may be input to the processing system 600, which reads the files and executes the programs therein using one or more processors (CPUs, GPUs, or VPUs). Some of the elements of a processing system 600 are shown in FIG. 6 wherein a processor 602 is shown having an input/output (I/O) section 604, a Central Processing Unit (CPU) 606, and a memory section 608. There may be one or more processors 602, such that the processor 602 of the processing system 600 comprises a single central-processing unit 606, or a plurality of processing units. The processors may be single core or multi-core processors. The processing system 600 may be a conventional computer, a distributed computer, or any other type of computer. The described technology is optionally implemented in software loaded in memory 608, a storage unit 612, and/or communicated via a wired or wireless network link 614 on a carrier signal (e.g., Ethernet, 3G wireless, 8G wireless, LTE (Long Term Evolution)) thereby transforming the processing system 600 in FIG. 6 to a special purpose machine for implementing the described operations. The processing system 600 may be an application specific processing system configured for supporting a distributed ledger. In other words, the processing system 600 may be a ledger node.

The I/O section 604 may be connected to one or more user-interface devices (e.g., a keyboard, a touch-screen display unit 618, etc.) or a storage unit 612. Computer program products containing mechanisms to effectuate the systems and methods in accordance with the described technology may reside in the memory section 608 or on the storage unit 612 of such a system 600.

A communication interface 624 is capable of connecting the processing system 600 to an enterprise network via the network link 614, through which the computer system can receive instructions and data embodied in a carrier wave. When used in a local area networking (LAN) environment, the processing system 600 is connected (by wired connection or wirelessly) to a local network through the communication interface 624, which is one type of communications device. When used in a wide-area-networking (WAN) environment, the processing system 600 typically includes a modem, a network adapter, or any other type of communications device for establishing communications over the wide area network. In a networked environment, program modules depicted relative to the processing system 600 or portions thereof, may be stored in a remote memory storage device. It is appreciated that the network connections shown are examples of communications devices for and other means of establishing a communications link between the computers may be used.

In an example implementation, a user interface software module, a communication interface, an input/output interface module, a ledger node, and other modules may be embodied by instructions stored in memory 608 and/or the storage unit 612 and executed by the processor 602. Further, local computing systems, remote data sources and/or services, and other associated logic represent firmware, hardware, and/or software, which may be configured to assist in supporting a distributed ledger. A ledger node system may be implemented using a general-purpose computer and specialized software (such as a server executing service software), a special purpose computing system and specialized software (such as a mobile device or network appliance executing service software), or other computing configurations. In addition, keys, device information, identification, configurations, etc. may be stored in the memory 608 and/or the storage unit 612 and executed by the processor 602.

The processing system 600 may be implemented in a device, such as a user device, storage device, IoT device, a desktop, laptop, computing device. The processing system 600 may be a ledger node that executes in a user device or external to a user device.

Data storage and/or memory may be embodied by various types of processor-readable storage media, such as hard disc media, a storage array containing multiple storage devices, optical media, solid-state drive technology, ROM, RAM, and other technology. The operations may be implemented processor-executable instructions in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible data storage device, including non-volatile memories (such as flash memory and the like) and volatile memories (such as dynamic random-access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of example embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A method comprising:
  generating servo adaptive parameters (SAPs) by heads;
  generating an interim OCLIM value based on the SAPs by heads and a plurality of read adjust parameters (RAPs) by heads for a plurality of drives; and
  operating a disc drive write element using the interim OCLIM value.

2. The method of claim 1, further comprising storing the SAPs by heads in an servo adaptive parameters (SAP) table.

3. The method of claim 1, further comprising receiving a global OCLIM adjust limit (GOAL) parameter and adjusting the interim OCLIM value based on the GOAL parameter to generate the final OCLIM value.

4. The method of claim 1, further comprising performing servo certification of a plurality of drives in a storage device to generate SAPs by zones.

5. The method of claim 1, wherein generating the interim OCLIM value further comprising right shifting the RAPs and adding the right-shifted RAPs to the SAPs by heads.

6. The method of claim 5, wherein right shifting the RAPs further comprising right shifting the RAPs by 4 bits.

7. The method of claim 1, further comprising setting a value of a GOAL parameter to zero at end of servo certification.

8. The method of claim 7, further comprising changing the GOAL parameter during the certification based on observed track mis-registration rate (TMR).

9. One or more processor-readable storage media encoding processor-executable instructions for executing on a computer system a computer process, the computer process comprising:
generating servo adaptive parameters (SAPs) by heads;
generating a plurality of read adjust parameters (RAPs) by heads for a plurality of drives;
generating an interim OCLIM value based on the SAPs by heads and RAPs by zones; and
operating a disc drive write element using the interim OCLIM value.

10. The one or more processor-readable storage media of claim 9, wherein the computer process further comprising:
receiving a global OCLIM adjust limit (GOAL) parameter; and
adjusting the interim OCLIM value based on the GOAL parameter to generate the final OCLIM value.

11. The one or more processor-readable storage media of claim 10, wherein generating the interim OCLIM value further comprising right shifting the RAPs and adding the right-shifted RAPs to the SAPs by heads.

12. The one or more processor-readable storage media of claim 11, wherein the computer process further comprising right shifting the RAPs by 4 bits.

13. The one or more processor-readable storage media of claim 9, wherein the computer process further comprising performing servo certification of a plurality of drives in a storage device to generate SAPs by zones.

14. The one or more processor-readable storage media of claim 9, wherein the computer process further comprising setting a value of a GOAL parameter to zero at end of servo certification.

15. The one or more processor-readable storage media of claim 14, wherein the computer process further comprising changing the GOAL parameter during the certification based on observed track mis-registration rate (TMR).

16. In a computing environment, a method performed at least in part on at least one processor, the method comprising:
performing servo certification of a plurality of drives in a storage device to generate servo adaptive parameters (SAPs) by heads;
generating an interim OCLIM value based on the SAPs by heads and read adjust parameters (RAPs) by zones; and
operating a disc drive write element using the interim OCLIM value.

17. The method of claim 16, further comprising:
receiving a global OCLIM adjust limit (GOAL) parameter; and
adjusting the interim OCLIM value based on the GOAL parameter to generate the final OCLIM value.

18. The method of claim 16, wherein generating the interim OCLIM value further comprising:
right shifting the RAPs by 4 bits; and
adding the right-shifted RAPs to the SAPs by heads.

19. The method of claim 16, further comprising setting a value of a GOAL parameter to zero at end of the servo certification.

20. The method of claim 16, further comprising changing a GOAL parameter during the certification based on observed track mis-registration rate (TMR).

* * * * *